(12) United States Patent
Wang et al.

(10) Patent No.: US 11,568,833 B2
(45) Date of Patent: Jan. 31, 2023

(54) STRUCTURE FOR COLLECTING LIGHT FIELD INFORMATION, DISPLAY DEVICE, AND CONTROL METHOD OF DISPLAY DEVICE

(71) Applicant: BOE Technology Group Co., Ltd., Beijing (CN)

(72) Inventors: Pengpeng Wang, Beijing (CN); Xue Dong, Beijing (CN); Haisheng Wang, Beijing (CN); Xiaoliang Ding, Beijing (CN); Lei Wang, Beijing (CN); Lin Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 288 days.

(21) Appl. No.: 16/911,501

(22) Filed: Jun. 25, 2020

(65) Prior Publication Data

US 2021/0193078 A1    Jun. 24, 2021

(30) Foreign Application Priority Data

Dec. 19, 2019    (CN) .......................... 201911318211.9

(51) Int. Cl.
*G09G 5/10* (2006.01)
*H04N 5/225* (2006.01)
(Continued)

(52) U.S. Cl.
CPC ............... *G09G 5/10* (2013.01); *G02B 3/005* (2013.01); *H04N 5/22541* (2018.08);
(Continued)

(58) Field of Classification Search
CPC ......... G09G 2360/144; G09G 2354/00; G09G 5/10; G06T 7/557; G02B 3/005; H04N 5/22541
See application file for complete search history.

(56) References Cited

U.S. PATENT DOCUMENTS

2013/0321581 A1    12/2013  El-Ghoroury et al.
2015/0070536 A1     3/2015  Sasaki et al.
(Continued)

FOREIGN PATENT DOCUMENTS

CN    104081257 A    10/2014
CN    104469194 A     3/2015
(Continued)

OTHER PUBLICATIONS

Office Action for corresponding Chinese Application No. 201911318211.9 dated Nov. 10, 2020.

*Primary Examiner* — Gerald Johnson
(74) *Attorney, Agent, or Firm* — ArentFox Schiff LLP; Michael Fainberg

(57) ABSTRACT

The present disclosure discloses a structure for collecting light field information, a display device, and a control method of the display device. The structure for collecting light field information includes a base substrate, a plurality of sensor chips located on the base substrate, where each of the plurality of sensor chips includes a plurality of sensing units arranged in an array, and a plurality of micro-imaging structures located above a side, facing away from the base substrate, of the plurality of sensor chips. Each of the plurality of micro-imaging structures corresponds to a respective one of the sensor chips. An orthographic projection of the respective one sensor chip on the base substrate has an overlapping region with an orthographic projection of the each micro-imaging structure on the base substrate. The respective one sensor chip is configured to receive light field information passing through the each micro-imaging structure.

17 Claims, 11 Drawing Sheets

(51) Int. Cl.
*G02B 3/00* (2006.01)
*G06T 7/557* (2017.01)

(52) U.S. Cl.
CPC .......... *G06T 7/557* (2017.01); *G09G 2354/00* (2013.01); *G09G 2360/144* (2013.01)

(56) References Cited

U.S. PATENT DOCUMENTS

| | | |
|---|---|---|
| 2017/0324912 A1 | 11/2017 | Lo |
| 2019/0149750 A1 | 5/2019 | Thebault et al. |
| 2020/0380240 A1* | 12/2020 | Liu .................. G06V 40/13 |

FOREIGN PATENT DOCUMENTS

| | | |
|---|---|---|
| CN | 104509088 A | 4/2015 |
| CN | 107347129 A | 11/2017 |
| CN | 107347132 A | 11/2017 |

* cited by examiner

--Related Art--

STRUCTURE FOR COLLECTING LIGHT FIELD INFORMATION, DISPLAY DEVICE, AND CONTROL METHOD OF DISPLAY DEVICE

The present application claims priority to Chinese Patent Application No. 201911318211.9 filed with the Chinese Patent Office on Dec. 19, 2019, which is hereby incorporated by reference in its entirety.

FIELD

The present disclosure relates to the field of display technology, and in particular, to a structure for collecting light field information, a display device, and a control method of the display device.

BACKGROUND

With the development of science and technology, people have higher and higher requirements on image collection devices such as cameras. The advent of light field cameras has attracted much attention.

A light field camera in the related art includes a main lens for capturing light, and photosensitive elements for acquiring light field information, and microlens array is arranged between the main lens and the photosensitive elements, for refocusing an image formed by the main lens, and processing the light field information acquired by the photosensitive elements to obtain an image desired by a user.

SUMMARY

Embodiments of the present disclosure provide a structure for collecting light field information, a display device, and a control method of the display device.

In a first aspect, an embodiment of the present disclosure provides a structure for collecting light field information, including a base substrate, a plurality of sensor chips located on the base substrate, where each of the plurality of sensor chips includes a plurality of sensing units arranged in an array; and a plurality of micro-imaging structures which are located above a side, facing away from the base substrate, of the sensor chips, where each of the plurality of micro-imaging structures corresponds to a respective one of the sensor chips; an orthographic projection of the respective one sensor chip on the base substrate has an overlapping region with an orthographic projection of the each micro-imaging structure on the base substrate, and the respective one sensor chip is configured to receive light field information passing through the each micro-imaging structure.

In a possible implementation, in the structure for collecting light field information provided by an embodiment of the present disclosure, the micro-imaging structures are micro-lens structures.

In a possible implementation, in the structure for collecting light field information provided by an embodiment of the present disclosure, the micro-lens structures are a thin film with micro-lenses.

In a possible implementation, the light field information collecting structure provided by an embodiment of the present disclosure further includes support structures located on the base substrate, where each of the support structures is located between a pair of two adjacent sensor chips; and where the distance between the upper surface of each of the support structures and the base substrate is greater than depth at which the sensor chips is embedded into the base substrate, when the sensor chips are embedded to the base substrate, so that surface of the base substrate remains flat; and the micro-lens structures are fixed to the support structures, and are spaced from the upper surfaces of the plurality of sensor chips by a preset distance.

In a possible implementation, in the light field information collecting structure provided by an embodiment of the present disclosure, each of the micro-imaging structures includes a plurality of micro-lens structures arranged in a stacked manner, where optical axes of the plurality of micro-lens structures arranged in the stacked manner coincide.

In a possible implementation, in the structure for collecting light field information provided by an embodiment of the present disclosure, the structure for collecting light field information includes a central area and an edge area; where the density of the sensor chips within the central area is greater than the density of the sensor chips within the edge area.

In a second aspect, an embodiment of the present disclosure further provides a display device, including the structure for collecting light field information provided by any embodiment of the first aspect, a control processing circuit, and a display panel, where the control processing circuit is electrically connected to the structure for collecting light field information and the display panel, and the control processing circuit is configured to acquire the light field information according to a user instruction, process the light field information, and provide the processed light field information to the display panel, and where the light field information is collected by sensing units in an area indicated by the user instruction of the structure for collecting light field information.

In a possible implementation, in the display device provided by an embodiment of the present disclosure, the control processing circuit includes a sub-circuit for dynamic partition selective control, a sub-circuit for row read-out and a sub-circuit for column read-out, where the sub-circuit for dynamic partition selective control is configured to receive the user instruction, and provide a row control instruction to the sub-circuit for row read-out and provide a column control instruction to the sub-circuit for column read-out according to the user instruction; where the sub-circuit for row read-out is configured to provide a first light field information output instruction to sensing units on a row indicated by the row control instruction; where the sub-circuit for column read-out is configured to provide a second light field information output instruction to sensing units on a column indicated by the column control instruction; and where sensing units receiving both the first light field information output instruction and the second light field information output instruction are configured to output the light field information.

In a possible implementation, the display device provided by an embodiment of the present disclosure further includes a dynamic memory circuit, where the dynamic memory circuit is connected between the plurality of sensing units and the control processing circuit, and the dynamic memory circuit is configured to store the light field information collected by the structure for collecting light field information to be acquired by the control processing circuit.

In a possible implementation, the display device provided by an embodiment of the present disclosure, the dynamic memory circuit and the sensing units are arranged in different layers.

In a possible implementation, the display device provided by an embodiment of the present disclosure includes a collection area for light field information and a peripheral area surrounding the collection area, where the structure for collecting light field information is located within the collection area, and the control processing circuit is located within the peripheral area, and the structure for collecting light field information is electrically connected to the control processing circuit through corresponding interfaces of the plurality of sensing units.

In a possible implementation, in the display device provided by an embodiment of the present disclosure, a light incident surface of the structure for collecting light field information is disposed away from a light emergent surface of the display panel.

In a third aspect, an embodiment of the present disclosure further provides a control method of the display device, including: acquiring, by the structure for collecting light field information, light field information of an environment where the structure for collecting light field information is located; acquiring, by the control processing circuit, light field information collected by the sensing units within an area indicated by the user instruction of the structure for collecting light field information, processing the light field information, and providing the processed light field information to the display panel; and acquiring, by the display panel, the processed light field information, and performing display according to the processed light field information.

In a possible implementation, in the control method of the display device provided by an embodiment of the present disclosure, the step of acquiring, by the control processing circuit, light field information collected by the sensing units within an area indicated by the user instruction of the structure for collecting light field information includes: receiving, by a sub-circuit for dynamic partition selective control of the control processing circuit, the user instruction; providing a row control instruction to a sub-circuit for row read-out of the control processing circuit and providing a column control instruction to a sub-circuit for column read-out of the control processing circuit according to the user instruction; providing, by the sub-circuit for row read-out, a first light field information output instruction to the sensing units on a row indicated by the row control instruction; providing, by the sub-circuit for column read-out, a second light field information output instruction to the sensing units on a column indicated by the column control instruction; and acquiring the light field information corresponding to the sensing units that receive both the first light field information output instruction and the second light field information output instruction.

DETAILED DESCRIPTION OF THE EMBODIMENTS

In the related art, there is a large distance between the main lens and the microlens array. When such a light field camera is integrated on a display device, it will occupy a large volume and even protrude from the surface of the display device in order to meet the imaging principle, which will increase the thickness of the display device, and is not conducive to the realization of the thinness of the display device.

Therefore, how to design a structure for collecting light field information to achieve thinness of a display device is a technical problem to be solved urgently by those skilled in the art.

Figure 1:
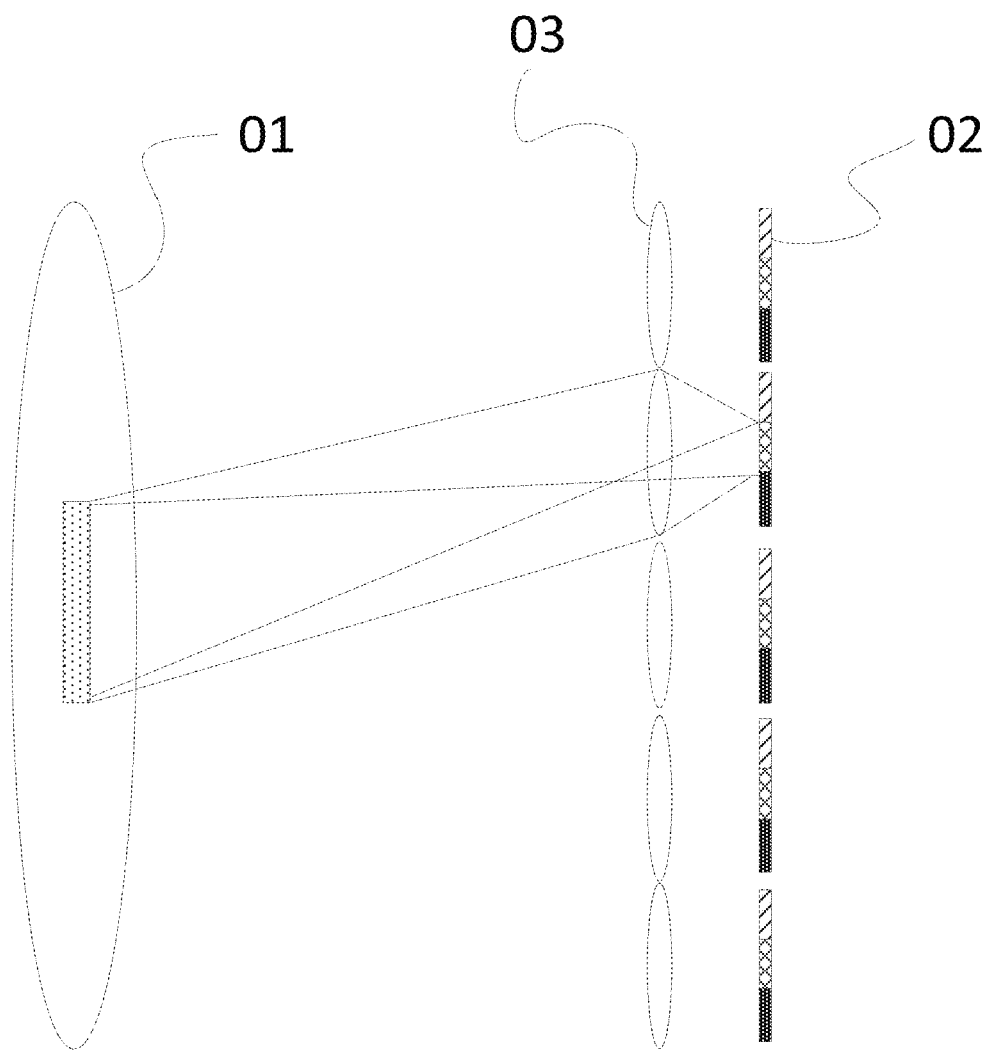
FIG. 1 is a structural schematic diagram of a light field camera in the related art.

As shown in FIG. 1, the structure of a light field camera in the related art includes a main lens 01 and photosensitive elements 02 for acquiring light field information, and a microlens array 03 is arranged between the main lens 01 and the photosensitive elements 02, for refocusing an image formed by the main lens 01, and processing the light field information acquired by the photosensitive elements 02 to obtain an image desired by a user. However, due to a large distance between the main lens 01 and the microlens array 03, in order to satisfy the imaging principle, when such a light field camera is integrated on a display device, it may occupy a large volume and even protrude from the surface of the display device, which may increase the thickness of the display device, and is not conducive to the realization of thinness of the display device.

Based on the above problems of the light field camera existing in the related art, embodiments of the present disclosure provide a structure for collecting light field information, a display device, and a control method of the display device. To make the object, technical solutions and advantages of the present disclosure clearer, specific implementations of the structure for collecting field information collecting, the display device and the control method of the display device provided by the embodiments of the present disclosure will be described in detail below in conjunction with the drawings. It should be understood that the preferred embodiments described below are only used for illustrating and explaining the present disclosure, and are not intended to limit the present disclosure. Moreover, the embodiments in the present application and the features in the embodiments may be combined with each other without conflicts.

Unless otherwise defined, technical or scientific terms used in the present disclosure shall have the ordinary meanings understood by those of ordinary skill in the art to which the present disclosure pertains. The terms "first", "second"

and the like used in present disclosure do not indicate any order, quantity or importance, but are only used to distinguish different components. Words such as "including" or "containing" indicate that an element or item appearing before such a word covers listed elements or items appearing after the word and equivalents thereof, and does not exclude other elements or items. Words such as "connect" or "connect with" are not limited to physical or mechanical connections, but may include electrical connections, whether direct or indirect. Words such as "up", "down", "left" or "right" are only used to indicate a relative positional relationship. When the absolute position of a described object changes, the relative positional relationship may also change accordingly.

The shapes and sizes of the components in the drawings do not reflect the true scale, and are merely intended to illustrate the present disclosure.

Optionally, an embodiment of the present disclosure provides a structure for collecting light field information. As shown in FIG. 2 to FIG. 5, the structure for collecting light field information includes a base substrate 1, and a plurality of sensor chips 2 located on the base substrate 1. Each of the sensor chips 2 includes a plurality of sensing units 21 arranged in an array.

The structure for collecting light field information further includes micro-imaging structures 3 which are located on the side, facing away from the base substrate 1, of the sensor chips 2 and corresponding with the sensor chips 2.

Orthographic projections of the sensor chips 2 on the base substrate 1 have an overlapping area with orthographic projections of the micro-imaging structures 3 on the base substrate 1, and the sensor chips 2 are configured to receive light field information passing through the micro-imaging structures 3.

In the structure for collecting light field information provided by an embodiment of the present disclosure, ambient light to be imaged is captured by the plurality of micro-imaging structures, and imaging light of the micro-imaging structures is sensed by the sensing units arranged in each of the sensor chips, and the light field information corresponding with the imaging light is provided to a processing circuit in a display device for processing to obtain an image desired by a user.

In the related art, the main lens of the light field camera is used for imaging, and the microlens are used for beam splitting, while in the structure for collecting light field information provided by an embodiment of the present disclosure, the micro-imaging structures are directly used for imaging and beam splitting, and the micro-imaging structures can directly capture the ambient light without using a main lens, so that the thickness of the structure for collecting light field information is greatly reduced, which is conducive to achieving surface planarity and overall thinness of a display device when the structure is integrated in the display device.

In the structure for collecting light field information in the present disclosure, each sensor chip includes a plurality of sensing units arranged in an array, so the entire light field information collecting structure includes a very large number of sensing units, which can record a very large number of light field beams (more than 100 times greater than 8 k*4 k resolution). In this way, the light beams in the space can be recorded finely. That is, each sensing unit records part of the light within the spatial range of the light field, then all the light is spliced, calculated and processed by the structure provided in the present disclosure, finally all the light within the spatial range of the light field is collected, and then the light field is displayed by the corresponding display device to form ultimate light field display experience.

Figure 6:
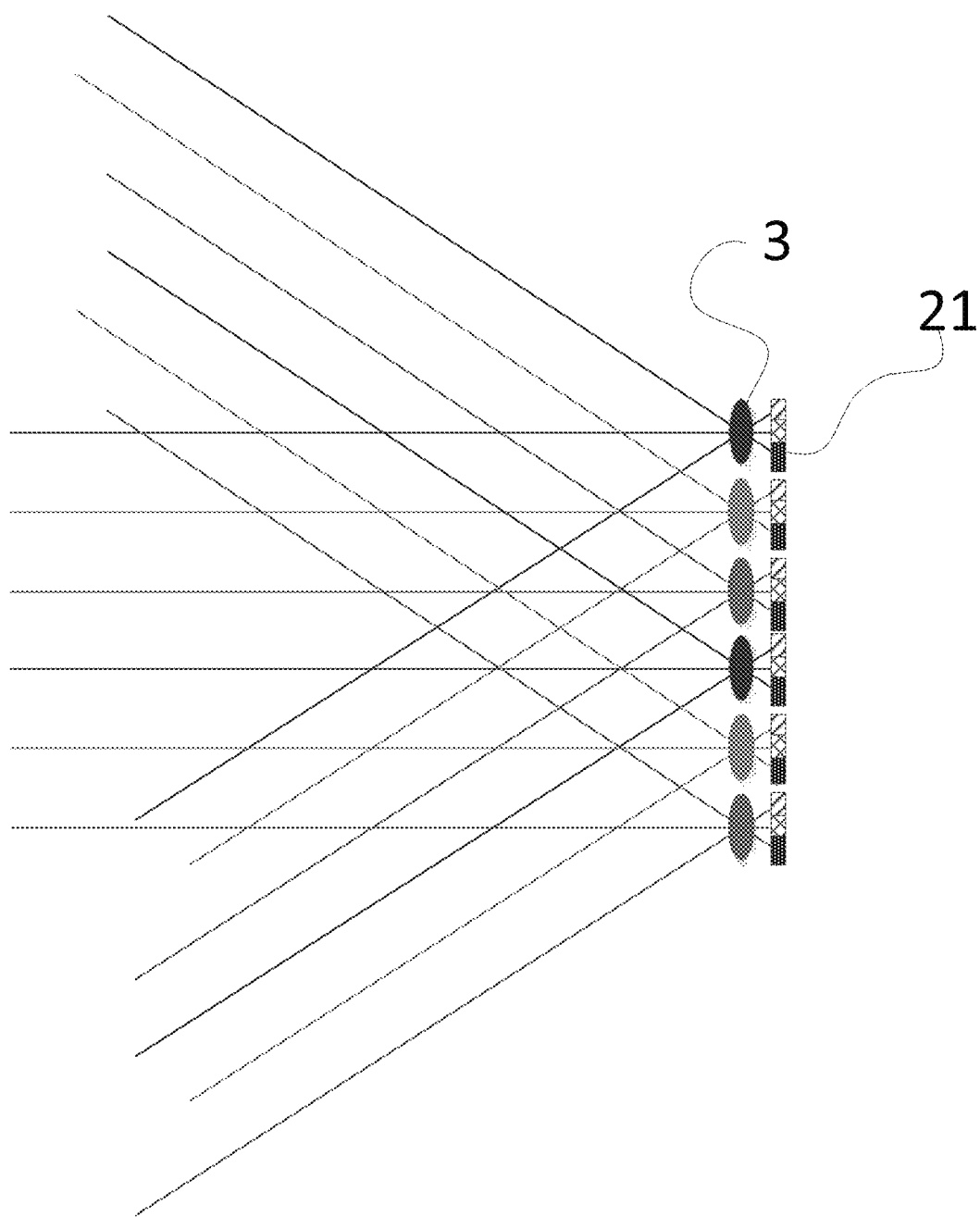
FIG. 6 is a structural schematic diagram of optical paths of a structure for collecting light field information provided by an embodiment of the present disclosure.

Optionally, the optical paths of the structure for collecting light field information provided by an embodiment of the present disclosure are shown in FIG. 6, in which each micro-imaging structure 3 corresponds to a plurality of sensing units 21, and each sensing unit 21 receives a beam of light in the space (a cross section with three sensing units 21 is used as an example for illustration in FIG. 6, and three beams of light can be received at the cross section); the sensing units 21 corresponding to each micro-imaging structure 3 respectively receive the corresponding light beams in the space; and the directions of the corresponding light beams and their azimuths in the space are fixed, i.e. the light field information (x, y, z, θ, φ) is determined, where x, y and z are the coordinates of the points through which the beams pass in the space, and θ and φ are azimuth angles of the beams. Each sensing unit 21 corresponds to a sole light beam, and the plurality of sensing units 21 correspond to numerous light beams in the space. These light beams form countless intersection points in the space, and each intersection point corresponds to a clear image that can be formed on the array of sensing units 21 by this point in the space, where calculation is performed based on forming an image of one point in the space on at least two sensing units 21. In this way, points with clear imaging are formed in the space, which are called an imaging point cloud. The light field information received by the sensing units 21 is directly stored in a storage unit to be called for subsequent image processing.

Optionally, in structure for collecting the light field information provided by an embodiment of the present disclosure, the micro-imaging structures are micro-lens structures.

The micro-imaging structures may be micro-lens structures or small holes to achieve imaging of the ambient light on the sensing units. Of course, the micro-imaging structures are not limited to this. All micro-imaging structures that meet the above-mentioned requirement are within the scope of the present disclosure, and are not specifically limited herein.

Figure 2:
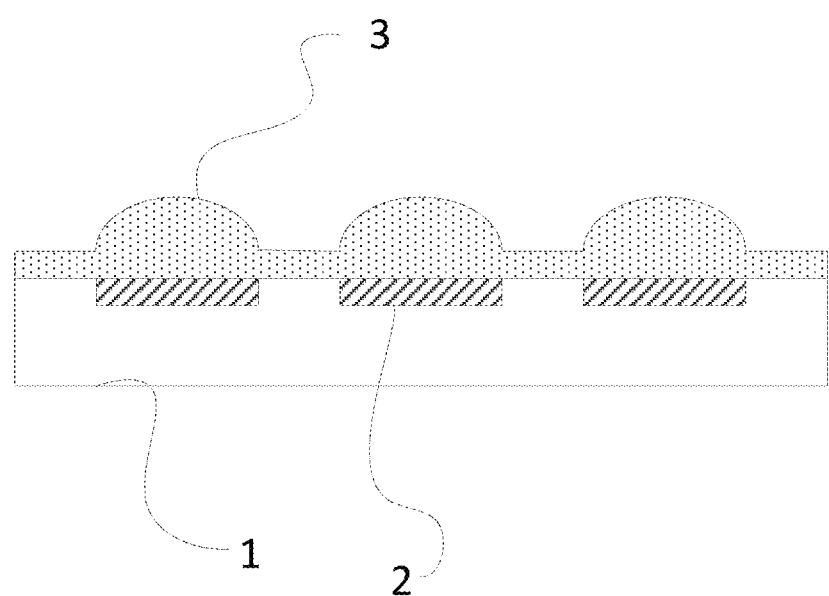
FIG. 2 is a first structural schematic diagram of a structure for collecting light field information provided by an embodiment of the present disclosure.

Optionally, in the light field information collecting structure provided by an embodiment of the present disclosure, as shown in FIG. 2, the micro-lens structures may be a thin film with microlens.

When the micro-lens structures are a thin film with microlens, the microlens are integrally formed with the thin film, i.e. an integral microlens array film is formed, and the micro-lens array film directly covers the base substrate provided with the sensor chips. Optionally, when the micro-lens structures are the thin film with microlens, the base substrate may be provided with grooves at positions corresponding to the sensor chips, and the sensor chips are placed in the grooves. In this embodiment, the base substrate ensures that the upper surface is planar while the sensor chips are set up, which is convenient for the arrangement of the micro-lens array film.

Figure 3:
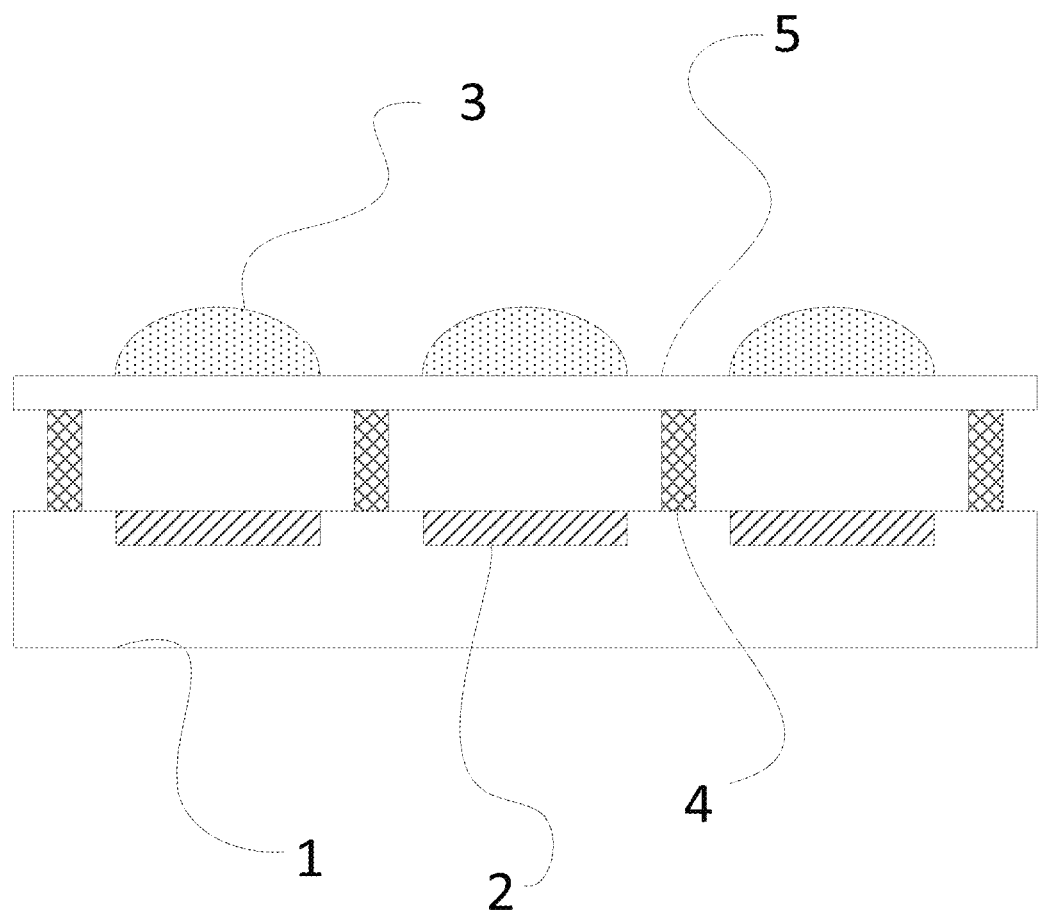
FIG. 3 is a second structural schematic diagram of a structure for collecting light field information provided by an embodiment of the present disclosure.
Figure 4:
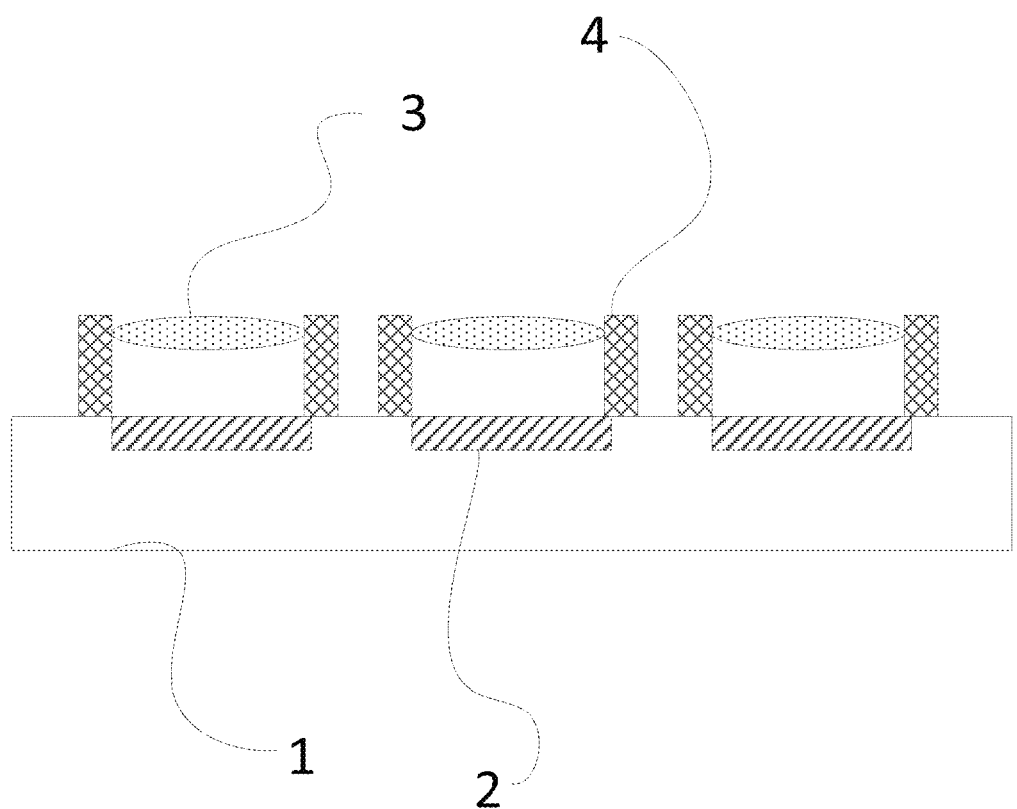
FIG. 4 is a third structural schematic diagram of a structure for collecting light field information provided by an embodiment of the present disclosure.
Figure 5:
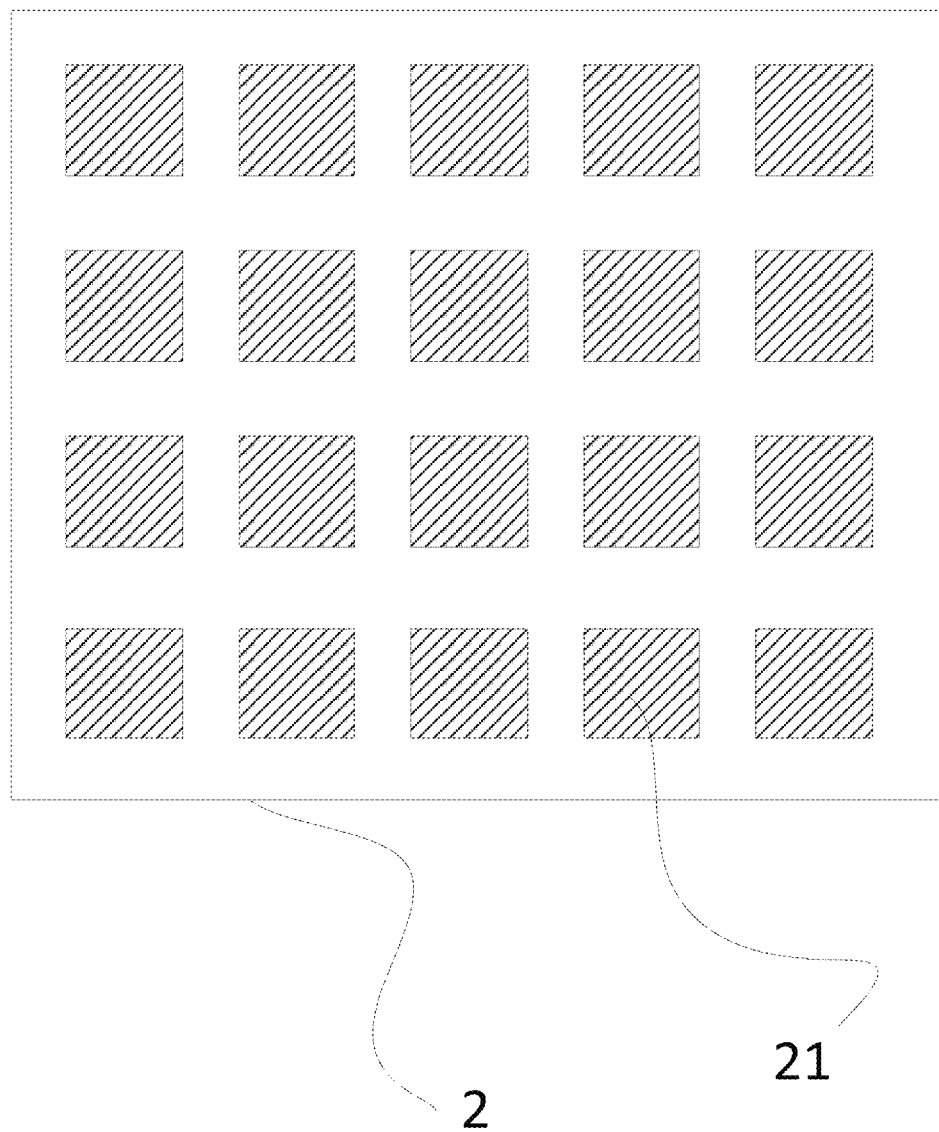
FIG. 5 is a structural schematic diagram of a sensor chip provided by an embodiment of the present disclosure.

Optionally, the structure for collecting light field information provided by an embodiment of the present disclosure, as shown in FIG. 3 and FIG. 4, further includes support structures 4 on the base substrate 1, where the support structures 4 are located between adjacent photosensitive chips 2.

The distance between the upper surfaces of each of the support structures 4 and the base substrate 1 is greater than the distance between the upper surfaces of the sensor chips 2 and the base substrate 1 (i.e., when the base substrate is provided with grooves at positions corresponding to sensor chips, the sensor chips are placed in grooves, the distance between the upper surfaces of the sensor chips 2 and the base substrate 1 equals to the depth of the groove); and the micro-lens structures 3 are fixed to the support structures 4, and are spaced from the upper surfaces of the photosensitive chips 2 by a preset distance.

It should be noted that, in the structure for collecting light field information shown in FIG. 2, the orthogonal projections of the sensor chips 2 on the base substrate 1 have overlapping regions with the orthogonal projections of the micro-imaging structures 3 on the base substrate 1, and the area of the orthographic projection of the sensor chips 2 on the base substrate 1 is greater than or equal to the area of the orthogonal projections of the microlens of the micro-imaging structures 3 on the base substrate 1; in the structure for collecting light field information shown in FIG. 3, the orthogonal projections of the sensor chips 2 on the base substrate 1 have overlapping regions with the orthogonal projections of the micro-imaging structures 3 on the base substrate 1, and the area of the orthographic projection of the sensor chips 2 on the base substrate 1 is greater than or equal to the area of the orthogonal projections of the micro-imaging structures 3 on the base substrate 1. The area of the orthographic projections of the sensing chips on the base substrate being set larger can ensure that all imaging optical paths of the micro-imaging structures fall on the sensor chips to avoid loss of imaging information.

In the structure for collecting light field information provided by an embodiment of the present disclosure, to meet the imaging requirement of the micro-lens structures, the micro-lens structures need to be spaced from the sensor chips by a preset distance, so the support structures need to be arranged to support the micro-lens structures. Optionally, to enable the sensor chips to sense the imaging optical paths of the micro-lens structures, each sensor chip needs to be arranged at a position of one focal length of the corresponding micro-lens structure to form a real image on the sensor chip, where the preset distance needs to be set to be equal to one focal length of the corresponding micro-lens structure, and the specific value range of the preset distance may differ correspondingly for different micro-lens structures arranged, and is not specifically limited herein.

The support structures may be support columns. In the case where the support structures are support columns, the micro-lens structures are located on the upper surfaces of the support columns, as shown in FIG. 3. The support structures may also be lens tubes. In the case where the support structures are lens tubes, as the inner wall of each lens tube is provided with a component for supporting the micro-lens structure, the micro-lens structures may be clamped on the components for fixation, as shown in FIG. 4, and the lens tubes may be fixed on the base substrate by dispensing an adhesive thereon. In specific implementation, any one of the above-mentioned embodiments may be adopted according to the specific implementation, which is not specifically limited herein.

It should be noted that, in the case where the support structures are support columns, a plane support plate 5 needs to be arranged between the support columns and the micro-lens structures to bear the micro-lens structures, as shown in FIG. 3. The plane support plate 5 may be arranged as an entirety. Specifically, the micro-lens structures may be arranged at corresponding positions of the plane support plate, and then the plane support plate 5 provided with the micro-lens structures is fixed to the support columns. Optionally, shielding layers (not shown in the drawings) may also be arranged between adjacent micro-lens structures to prevent light crosstalk between the adjacent micro-lens structures.

Figure 7:
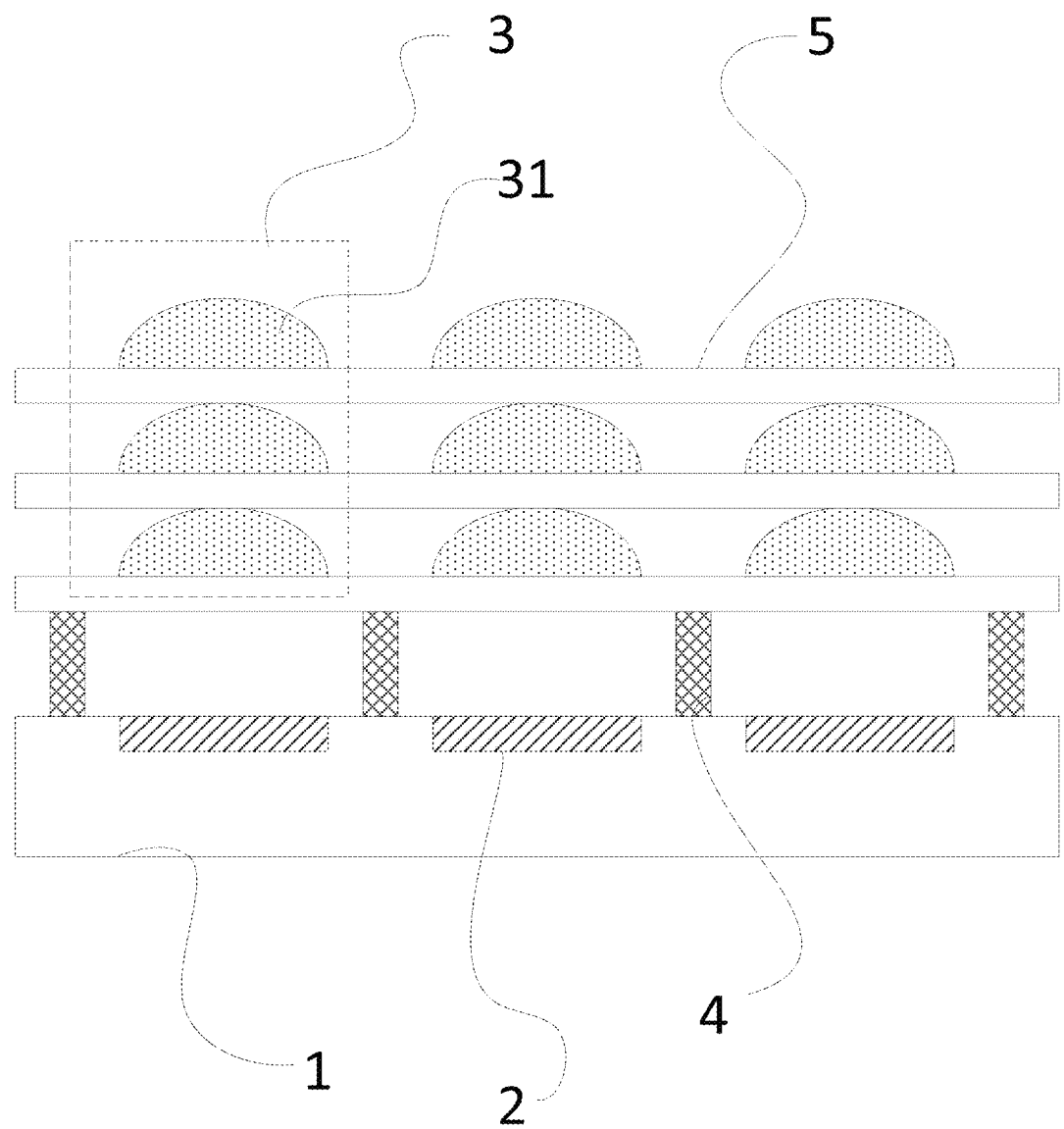
FIG. 7 is a fourth structural schematic diagram of a structure for collecting light field information provided by an embodiment of the present disclosure.
Figure 8:
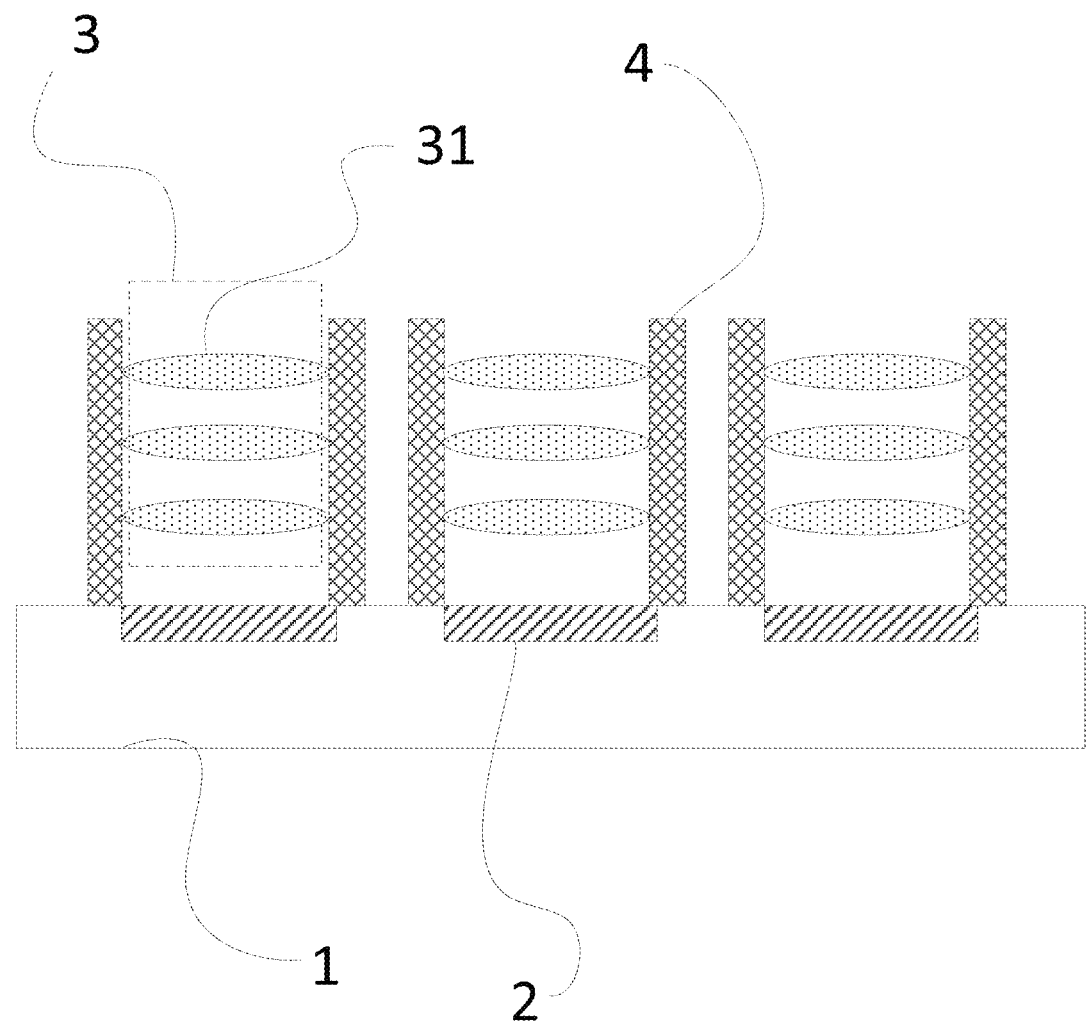
FIG. 8 is a fifth structural schematic diagram of a structure for collecting light field information provided by an embodiment of the present disclosure.

Optionally, in the structure for collecting light field information provided by an embodiment of the present disclosure, as shown in FIG. 7 and FIG. 8, each micro-imaging structure 3 includes a plurality of micro-lens structures 31 arranged in a stacked manner, and optical axes of the respective micro-lens structures 31 coincide.

Optionally, in the structure for collecting light field information provided by an embodiment of the present disclosure, to enhance the imaging effect of the micro-lens structures, a plurality of micro-lens structures may be arranged in a stacked manner, where the specific number of the micro-lens structures arranged is selected according to the imaging requirement, and is not specifically limited herein.

It should be noted that, as shown in FIG. 7 and FIG. 8, in the case where each micro-imaging structure 3 includes a plurality of micro-lens structures 31, the plurality of micro-lens structures 31 in each micro-imaging structure 3 form a lens group, which has an equivalent focal length. In a lens group, the height of the support structures 4 and the distance between the micro-lens structures 31 need to be set according to the equivalent focal length. As to whether to arrange, in a direction perpendicular to the base substrate, a corresponding support structure 4 between a pair of two adjacent micro-lens structures 31, it depends on a designed distance between the pair of two adjacent micro-lens structures 31. If the required distance between the pair of two adjacent micro-lens structures 31 can be satisfied when the support structures 4 are not arranged then there is no need to arrange the support structures 4. If the required distance between the pair of two adjacent micro-lens structures 31 cannot be satisfied, the support structures 4 need to be arranged. The specific height of the support structures 4 is selected according to actual needs, and is not specifically limited herein.

Figure 9:
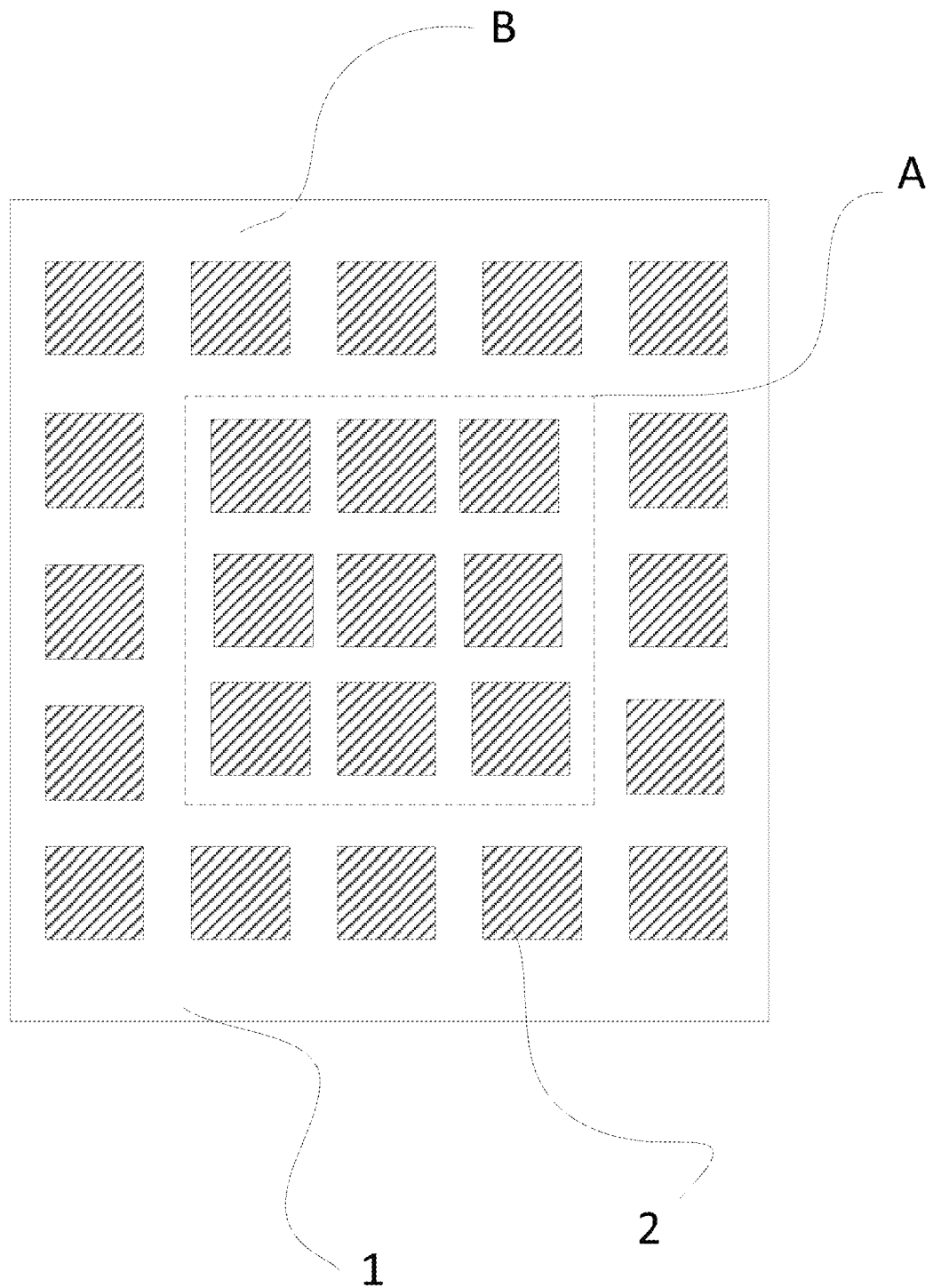
FIG. 9 is a structural schematic diagram of a distribution of sensor chips in a structure for collecting light field information provided by an embodiment of the present disclosure.

Optionally, in the structure for collecting light field information provided by an embodiment of the present disclosure, as shown in FIG. 9, the structure for collecting light field information includes a central area A and an edge area B.

The density of the sensor chips 2 within the central area A is greater than the density of the sensor chips 2 within the edge area B.

In the structure for collecting light field information provided by an embodiment of the present disclosure, to reduce the number of the arranged sensor chips and reduce the production cost, the density of the sensor chips within the central area may be set to be greater than the density of the sensor chips within the edge area. With this setting, the central area has a clearer resolution, so that people can focus on more important areas. Of course, the sensor chips may be uniformly arranged on the base substrate, to ensure that the resolution in the entire field of view is as equalized as possible. It may be selected according to the actual use, and it is not specifically limited herein.

Figure 10:
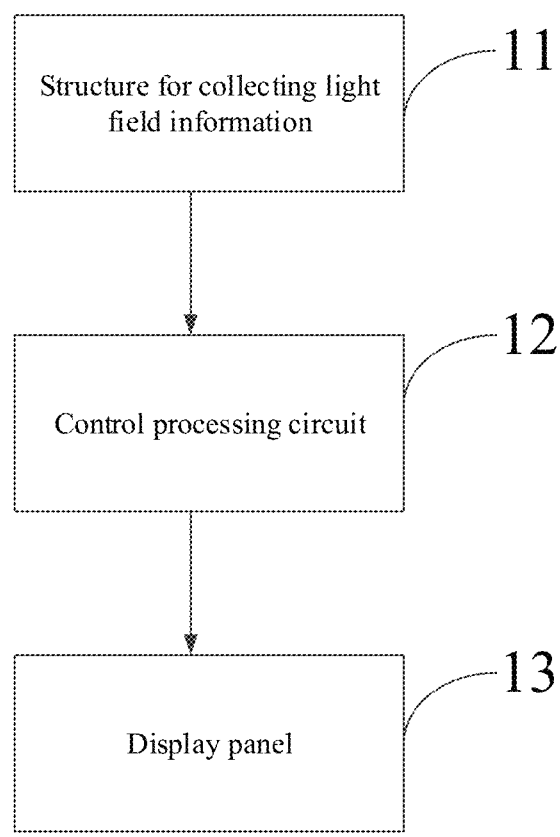
FIG. 10 is a structural schematic diagram of a display device provided by an embodiment of the present disclosure.

Based on the same inventive concept, an embodiment of the present disclosure further provides a display device. As shown in FIG. 10, the display device includes the structure for collecting light field information 11 provided by any of the above embodiments, a control processing circuit 12 and a display panel 13.

The control processing circuit 12 is electrically connected to the structure for collecting light field information 11 and the display panel 13, and the control processing circuit 12 is configured to acquire light field information collected by sensing units within an area indicated by the user instruction of the structure for collecting light field information 11, process the light field information, and provide the processed data to the display panel 13.

In the display device provided by an embodiment of the present disclosure, by arranging the control processing circuit, light field information collected by the sensing units may be selectively called according to a user instruction, and processed to form image information desired by the user. The light field information processing process may include data storage, conversion, calculation, and splicing, etc.

Figure 11:
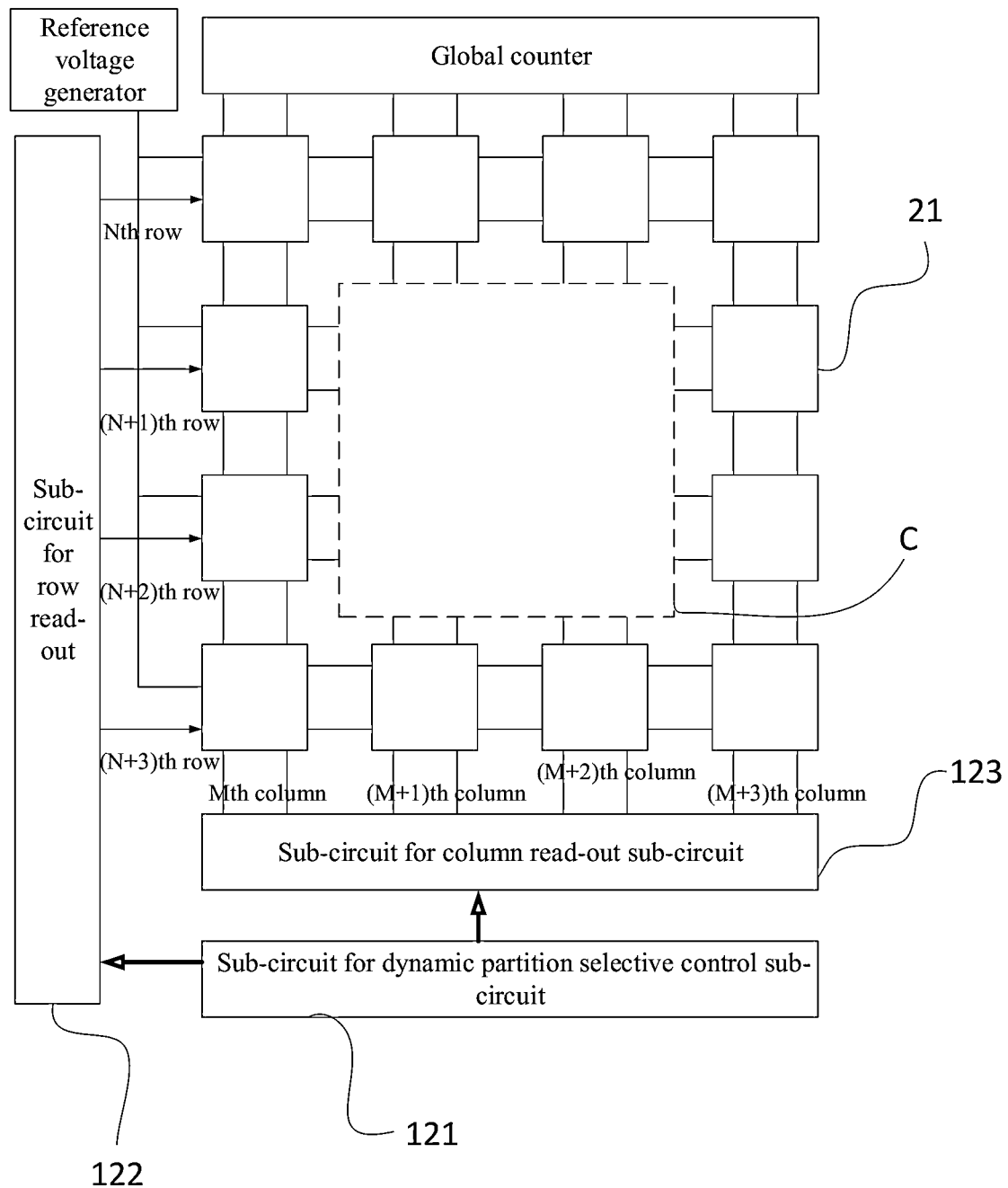
FIG. 11 is a structural schematic diagram of a control processing circuit provided by an embodiment of the present disclosure.

Optionally, in the display device provided by an embodiment of the present disclosure, as shown in FIG. 11, the control processing circuit includes a sub-circuit for dynamic partition selective control 121, a sub-circuit for row read-out 122 and a sub-circuit for column read-out 123.

The sub-circuit for dynamic partition selective control 121 is configured to receive the user instruction, and provide a row control instruction to the sub-circuit for row read-out 122 and provide a column control instruction to the sub-circuit for column read-out 123 according to the user instruction, to determine an area C where the light field information corresponding to the user instruction is located.

The sub-circuit for row read-out 122 is configured to provide a first light field information output instruction to the sensing units 21 on a row indicated by the row control instruction of the structure for collecting light field information.

The sub-circuit for column read-out sub-circuit 123 is configured to provide a second light field information output instruction to the sensing units 21 on a column indicated by the column control instruction of the structure for collecting light field information.

The sensing units 21 receiving both the first light field information output instruction and the second light field information output instruction are configured to output the light field information corresponding to the sensing units 21.

In the display device provided by an embodiment of the present disclosure, as shown in FIG. 11, when the light field information corresponding to the sensing units 21 within the area C needs to be called for an image desired by the user, the sub-circuit for dynamic partition selective control 121 transmits control instructions to the sub-circuit for row read-out 122 and the sub-circuit for column read-out 123, respectively, and controls the sub-circuit for row read-out 122 to provide the first light field information output instruction to the (N+1)th row and the (N+2)th row, but not to provide the first light field information output instruction to other rows; and controls the sub-circuit for column read-out 123 to provide the second light field information output instruction to the (M+1)th column and the (M+2)th column, but not to provide the second light field information output instruction to other columns. When the sensing units 21 receive both the first light field information output instruction and the second light field information output instruction at the same time, the light field information corresponding to the sensing units 21 is output for subsequent image processing.

It should be noted that the above embodiment is described by using an example that only chooses to call the light field information corresponding to the sensing units within the area C. In specific implementation, the corresponding light field information may be output from every other row or column, which may be selected according to the actual use, and is not specifically limited herein.

For example, when the user needs to acquire a panoramic image in the distance, the requirement on the details of the panoramic image is not high, so the sensing units may be controlled to perform output every other row or column, or every multiple rows or columns, which can greatly reduce the amount of data transmission and processing. When the user needs to acquire detailed information of a scene, the requirement on the image resolution is relatively high, so it is preferred to control all the sensing units to perform output of the light field to ensure the quality of an image formed therefrom.

As shown in FIG. 11, the control processing circuit may further include a global counter and a reference voltage generator. The global counter cooperates with bit memories in the sensing units to implement global analog-to-digital conversion (ADC), thereby speeding up data reading.

Optionally, the display device provided by an embodiment of the present disclosure further includes a dynamic memory circuit (not shown in the drawings).

The dynamic memory circuit is connected between the sensing units and the control processing circuit, and the dynamic memory circuit is configured to store the light field information collected by the structure for collecting light field information to be acquired by the control processing circuit.

In the display device provided by an embodiment of the present disclosure, the dynamic memory circuit is used for storing the light field information acquired by the sensing units, to avoid loss of the light field information when the sensing units perform continuous collection of the ambient light.

Optionally, in the display device provided by an embodiment of the present disclosure, the dynamic memory circuit and the sensing units are arranged in different layers.

Optionally, in the display device provided by an embodiment of the present disclosure, each electric power structure may be arranged in a different layer from the sensing units. That is, the control processing circuit and the dynamic memory circuit may be arranged in a different layer from the sensing units. This setting can increase the sensing area and ensure the collection density of light field information.

Optionally, the display device provided by an embodiment of the present disclosure includes a collection area for light field information and a peripheral area surrounding the collection area.

The structure for collecting light field information is located within the collection area for light field information, and the control processing circuit is located within the peripheral area, and the structure for collecting light field information is connected to the control processing circuit through corresponding interfaces of the sensing units.

Optionally, in the display device provided by an embodiment of the present disclosure, each sensing unit may be electrically connected to the control processing circuit through an lvds interface or a mipi interface. As an lvds interface or mipi interface bus has differential pairs, differential traces should be prepared on the base substrate. To reduce the trace resistance, thick copper or other process is usually used for the preparation to reduce the square resistance. Optionally, each lead wire may be led out from a single side or two sides, which is selected according to the actual need and is not specifically limited herein.

Optionally, in the display device provided by an embodiment of the present disclosure, a light incident surface of the structure for collecting light field information may be disposed away from a light emergent surface of the display panel.

Specifically, in the display device provided by an embodiment of the present disclosure, the structure for collecting light field information may be arranged on the back of the display panel. If the display device is a mobile phone, the structure for collecting light field information may be arranged at the position of a rear-facing camera. However, compared with a rear-facing camera of the related art, the structure for collecting light field information has a much smaller thickness than the rear-facing camera of the related art, such that the back of the display device may almost be a planar surface. Furthermore, the structure for collecting light field information provided by an embodiment of the present disclosure may be arranged in a large area, and even cover the entire back of the display panel. Of course, described above is only an example, which does not specifically limit its application scenarios. It is also within the scope of the present disclosure to apply the foregoing embodiment of the present disclosure to other similar scenarios.

Based on the same inventive concept, an embodiment of the present disclosure further provides a control method of the display device, including: acquiring, by the structure for collecting light field information, light field information of an environment where the structure for collecting light field information is located; acquiring, by the control processing circuit, light field information collected by the sensing units within an area indicated by the user instruction of the structure for collecting light field information, processing the light field information, and providing the processed data to the display panel; and acquiring, by the display panel, the processed data, and performing display according to the processed data.

Optionally, in the control method of the display device provided by an embodiment of the present disclosure, acquiring, by the control processing circuit, light field information collected by the sensing within an area indicated by the user instruction of the structure for collecting light field information, includes: receiving, by the sub-circuit for dynamic partition selective control, the user instruction; providing a row control instruction to the sub-circuit for row read-out and providing a column control instruction to the sub-circuit for column read-out according to the user instruction; providing, by the sub-circuit for row read-out, a first light field information output instruction to the sensing units on a row indicated by the row control instruction; providing, by the sub-circuit for column read-out, a second light field information output instruction to the sensing units on a column indicated by the column control instruction; and acquiring the light field information corresponding to the sensing units that receive both the first light field information output instruction and the second light field information output instruction at the same time.

The control method of the display device provided by the foregoing embodiment has all the advantages of the display device provided by the foregoing embodiment. Its principle and specific embodiment may be implemented by referring to the display device, which will not be repeated here.

Embodiments of the present disclosure provide a structure for collecting light field information, a display device, and a control method of the display device. The structure for collecting light field information includes a base substrate, and a plurality of sensor chips located on the base substrate, where each of the sensor chips includes a plurality of sensing units arranged in an array. The structure for collecting light field information further includes micro-imaging structures which are located on the side, facing away from the base substrate, of the sensor chips and each of the plurality of micro-imaging structures corresponds to a respective one of the sensor chips. An orthographic projection of the respective one sensor chips on the base substrate has an overlapping region with an orthographic projection of the each micro-imaging structure on the base substrate, and the respective one sensor chip is configured to receive light field information passing through the each micro-imaging structure. Ambient light to be imaged is captured by the plurality of micro-imaging structures, and imaging light of the micro-imaging structures is sensed by the sensing units arranged in the sensor chips, and the corresponding light field information is provided to a processing circuit in a display device for processing. Compared with a light field camera in the related art, the structure for collecting light field information provided by an embodiment of the present disclosure directly captures the ambient light by means of the micro-imaging structures without using a main lens, so that the thickness of the light field information collecting structure is greatly reduced, which is conducive to achieving surface planarity and overall thinness of a display device when the light field information collecting structure is integrated in the display device.

Apparently, those skilled in the art can make changes and modifications to the present disclosure without departing from the spirit and scope of the present disclosure. Thus, the present disclosure is also intended to encompass these changes and modifications if such changes and modifications of the present disclosure are within the scope of the claims of the present disclosure and equivalents thereof.

What is claimed is:

1. A structure for collecting light field information, comprising:
    a base substrate;
    a plurality of sensor chips located on the base substrate, wherein each of the plurality of sensor chips comprises a plurality of sensing units arranged in an array;
    a plurality of micro-imaging structures located above a side, facing away from the base substrate, of the plurality of sensor chips; and
    support structures located on the base substrate, wherein each of the support structures is located between a pair of two adjacent sensor chips; wherein
    each of the plurality of micro-imaging structures corresponds to a respective one of the sensor chips;
    an orthographic projection of the respective one sensor chip on the base substrate has an overlapping region with an orthographic projection of the each micro-imaging structure on the base substrate;
    the respective one sensor chip is configured to receive light field information passing through the each micro-imaging structure;
    the micro-imaging structures are micro-lens structures;
    distance between upper surface of each of the support structures and the base substrate is greater than depth at each of which the sensor chips is embedded into the base substrate, when the sensor chips are embedded to the base substrate, so that surface of the base substrate remains flat; and
    the micro-lens structures are fixed to the support structures, and are spaced from upper surfaces of the plurality of sensor chips by a preset distance.

2. The structure for collecting light field information of claim 1, wherein:
    the micro-lens structures are a thin film with microlens.

3. The structure for collecting light field information of claim 1, wherein:
    each of the micro-imaging structures comprises a plurality of micro-lens structures arranged in a stacked manner, wherein optical axes of the plurality of micro-lens structures arranged in the stacked manner coincide.

4. The structure for collecting light field information of claim 1, wherein:
the structure for collecting light field information comprises a central area and an edge area;
wherein density of sensor chips within the central area is greater than density of sensor chips within the edge area.

5. A display device, comprising:
the structure for collecting light field information of claim 1,
a control processing circuit, and
a display panel,
wherein the control processing circuit is electrically connected to the structure for collecting light field information and the display panel, and
the control processing circuit is configured to acquire the light field information according to a user instruction, process the light field information, and provide the processed light field information to the display panel; and
wherein the light field information is collected by sensing units in an area indicated by the user instruction of the structure for collecting light field information.

6. The display device of claim 5, wherein the control processing circuit comprises:
a sub-circuit for dynamic partition selective control,
a sub-circuit for row read-out, and
a sub-circuit for column read-out;
wherein the sub-circuit for dynamic partition selective control is configured to receive the user instruction, and provide a row control instruction to the sub-circuit for row read-out and provide a column control instruction to the sub-circuit for column read-out according to the user instruction; and
wherein the sub-circuit for row read-out is configured to provide a first light field information output instruction to sensing units on a row indicated by the row control instruction;
wherein the sub-circuit for column read-out is configured to provide a second light field information output instruction to sensing units on a column indicated by the column control instruction; and
wherein sensing units receiving both the first light field information output instruction and the second light field information output instruction are configured to output the light field information.

7. The display device of claim 5, further comprising a dynamic memory circuit, wherein
the dynamic memory circuit is connected between the plurality of sensing units and the control processing circuit, and the dynamic memory circuit is configured to store the light field information collected by the structure for collecting light field information to be acquired by the control processing circuit.

8. The display device of claim 7, wherein:
the dynamic memory circuit and the sensing units are arranged in different layers.

9. The display device of claim 5, comprising a collection area for light field information and a peripheral area surrounding the collection area, wherein
the structure for collecting light field information is located within the collection area, and
the control processing circuit is located within the peripheral area, and
wherein the structure for collecting light field information is electrically connected to the control processing circuit through corresponding interfaces of the plurality of sensing units.

10. The display device of claim 5, wherein:
a light incident surface of the structure for collecting light field information is disposed away from a light emergent surface of the display panel.

11. A control method of the display device of claim 5, comprising:
acquiring, by the structure for collecting light field information, light field information of an environment where the structure for collecting light field information is located;
acquiring, by the control processing circuit, light field information collected by the sensing units within an area indicated by the user instruction of the structure for collecting light field information, processing the light field information, and providing the processed light field information to the display panel; and
acquiring, by the display panel, the processed light field information, and performing display according to the processed light field information.

12. The control method of claim 11, wherein the acquiring, by the control processing circuit, light field information collected by the sensing units within an area indicated by the user instruction of the structure for collecting light field information, comprises:
receiving, by a sub-circuit for dynamic partition selective control of the control processing circuit, the user instruction; and
providing a row control instruction to a sub-circuit for row read-out of the control processing circuit and providing a column control instruction to a sub-circuit for column read-out of the control processing circuit according to the user instruction;
providing, by the sub-circuit for row read-out, a first light field information output instruction to the sensing units on a row indicated by the row control instruction;
providing, by the sub-circuit for column read-out, a second light field information output instruction to the sensing units on a column indicated by the column control instruction; and
acquiring the light field information corresponding to the sensing units that receive both the first light field information output instruction and the second light field information output instruction.

13. The structure for collecting light field information of claim 1, wherein:
the support structures are support columns;
the micro-lens structures are located on upper surfaces of the support columns; and
a plane support plate is arranged between the support columns and the micro-lens structures to bear the micro-lens structures.

14. The structure for collecting light field information of claim 1, wherein:
the support structures are lens tubes;
an inner wall of each lens tube is provided with a component for supporting the micro-lens structure; and
the micro-lens structures are clamped on the components for fixation.

15. The structure for collecting light field information of claim 1, wherein:
shielding layers are arranged between adjacent micro-lens structures.

16. A structure for collecting light field information, comprising:
a base substrate;
a plurality of sensor chips located on the base substrate, wherein each of the plurality of sensor chips comprises a plurality of sensing units arranged in an array; and
a plurality of micro-imaging structures located above a side, facing away from the base substrate, of the plurality of sensor chips; wherein
each of the plurality of micro-imaging structures corresponds to a respective one of the sensor chips;
an orthographic projection of the respective one sensor chip on the base substrate has an overlapping region with an orthographic projection of the each micro-imaging structure on the base substrate, and
the respective one sensor chip is configured to receive light field information passing through the each micro-imaging structure;
wherein the structure for collecting light field information comprises a central area and an edge area; and
density of sensor chips within the central area is greater than density of sensor chips within the edge area.

17. A structure for collecting light field information, comprising:
a base substrate;
a plurality of sensor chips located on the base substrate, wherein each of the plurality of sensor chips comprises a plurality of sensing units arranged in an array; and
a plurality of micro-imaging structures located above a side, facing away from the base substrate, of the plurality of sensor chips; wherein
each of the plurality of micro-imaging structures corresponds to a respective one of the sensor chips;
an orthographic projection of the respective one sensor chip on the base substrate has an overlapping region with an orthographic projection of the each micro-imaging structure on the base substrate;
the respective one sensor chip is configured to receive light field information passing through the each micro-imaging structure;
the micro-imaging structures are micro-lens structures;
each of the micro-imaging structures comprises a plurality of micro-lens structures arranged in a stacked manner; and
optical axes of the plurality of micro-lens structures arranged in the stacked manner coincide.

* * * * *